United States Patent
Lundy et al.

(10) Patent No.: US 8,306,508 B1
(45) Date of Patent: Nov. 6, 2012

(54) MOTION-BASED EVENT NOTIFICATION

(75) Inventors: Michael T. Lundy, Olathe, KS (US); Jason K. Whitney, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 714 days.

(21) Appl. No.: 12/195,876

(22) Filed: Aug. 21, 2008

(51) Int. Cl.
*H04M 1/725* (2006.01)

(52) U.S. Cl. .................. 455/412.2; 455/412.1; 455/413; 455/456.1; 455/456.2; 455/456.4

(58) Field of Classification Search ....... 455/412.1–413, 455/456.1–456.3, 404.2, 435.1, 357.46, 466; 379/88.12–88.14, 88.18
See application file for complete search history.

(56) References Cited

U.S. PATENT DOCUMENTS

| | | | | |
|---|---|---|---|---|
| 7,577,442 | B2 * | 8/2009 | Norta et al. | 455/456.1 |
| 7,787,857 | B2 * | 8/2010 | Peterman | 455/404.1 |
| 2003/0050046 | A1 * | 3/2003 | Conneely et al. | 455/412 |
| 2004/0127198 | A1 * | 7/2004 | Roskind et al. | 455/412.2 |
| 2004/0203606 | A1 * | 10/2004 | Souissi et al. | 455/412.1 |
| 2005/0227711 | A1 * | 10/2005 | Orwant et al. | 455/456.3 |
| 2006/0058036 | A1 * | 3/2006 | Watanabe et al. | 455/456.1 |
| 2007/0026869 | A1 * | 2/2007 | Dunko | 455/456.1 |
| 2009/0131072 | A1 * | 5/2009 | Razdan et al. | 455/456.1 |
| 2009/0298511 | A1 * | 12/2009 | Paulson | 455/456.1 |
| 2010/0004000 | A1 * | 1/2010 | Chen | 455/456.1 |

* cited by examiner

*Primary Examiner* — Kathy Wang-Hurst

(57) ABSTRACT

A method and computer-readable media are provided for presenting notifications to a user via a mobile communications device upon the device receiving an indication that an event has occurred, such as a telephone call, a voicemail, an e-mail, a text message, or a calendar event. A device may receive an indication that an event has occurred while it is in a motionless state, such as when the device has not detected its own movement for a predetermined amount of time. The device may track the event occurrence and may provide a notification of the event occurrence upon the device entering a moved state. A moved state may be entered upon when the device determines that it has been moved. If the device is in a motionless state when it receives the indication of the event, it may not provide a notification at that time.

19 Claims, 9 Drawing Sheets

MOTION-BASED EVENT NOTIFICATION

SUMMARY

The present invention is defined by the claims below. This summary is provided to introduce a selection of concepts in a simplified form that are further described below in the Detailed Description. This summary is not intended to identify key features or essential features of the claimed subject matter, nor is it intended to be used as an aid in isolation to determine the scope of the claimed subject matter.

Embodiments of the present invention provide systems, methods, and computer-readable media for, among other things, providing notifications of event occurrences, such as e-mails, telephone calls, text messages, voicemails, calendar events, or the like, upon the device being moved. A notification may be provided even when the device is in a motionless state, but may also be provided when the device transitions from a motionless state to a moved state. In one embodiment, the sender of an event may determine that the recipient of the event is not to be provided with a notification until the recipient's device has been moved, such that the device is no longer in a motionless state.

Accordingly, in one aspect, one or more computer-readable media having computer-useable instructions embodied thereon for performing a method of providing by way of a mobile communications device a notification of an occurrence of an event is provided. The method includes determining that the mobile communications device has entered into a motionless state, which is indicative of the mobile communications device having not physically moved for a threshold of time, and while in the motionless state, receiving an indication of the occurrence of the event. In addition, the method includes determining whether the mobile communications device is still in the motionless state. If the mobile communications device has transitioned to a moved state, then a normal notification of the occurrence of the event is provided, wherein the moved state begins when the mobile communications device is physically moved after having entered the motionless state, and wherein the normal notification corresponds to a notification that would have been provided if the mobile communications device were not in the motionless state. If the mobile communications device is still in the motionless state, the normal notification is not provided.

In another aspect, one or more computer-readable media having computer-useable instructions embodied thereon for performing a method of providing by way of a mobile communications device more than one notification of an occurrence of an event is provided. The method includes determining that the mobile communications device has entered into a motionless state, the motionless state being characterized by the mobile communications device not having been moved for a predetermined amount of time, and while in the motionless state, receiving an indication of the occurrence of the event, and upon receiving the indication of the event, providing a first notification of the occurrence of the event. Further, the method includes detecting movement of the mobile communications device, thereby removing it from the motionless state, and upon detecting the movement, providing a second notification of the occurrence of the event.

In a further aspect, one or more computer-readable media having computer-useable instructions embodied thereon for performing a method of providing a notification by way of a mobile communications device of an occurrence of an event is provided. The method includes receiving an indication of an event while the mobile communications device is in a motionless state, which is characterized by normally suppressing notifications of event occurrences, and inspecting the indication to determine whether it includes an attribute indicating that the mobile communications device is to present a notification of the occurrence of the event even if the mobile communications device is in the motionless state, so that if the attribute indicates that the mobile communications device is to present the notification of the occurrence of the event even if the mobile communications device is in the motionless state, presenting a first notification of the occurrence of the event. But, if the attribute indicates that the mobile communications device is not to present the notification of the occurrence of the event until the mobile communications device has entered a moved state, the method includes not presenting the notification of the occurrence of the event.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
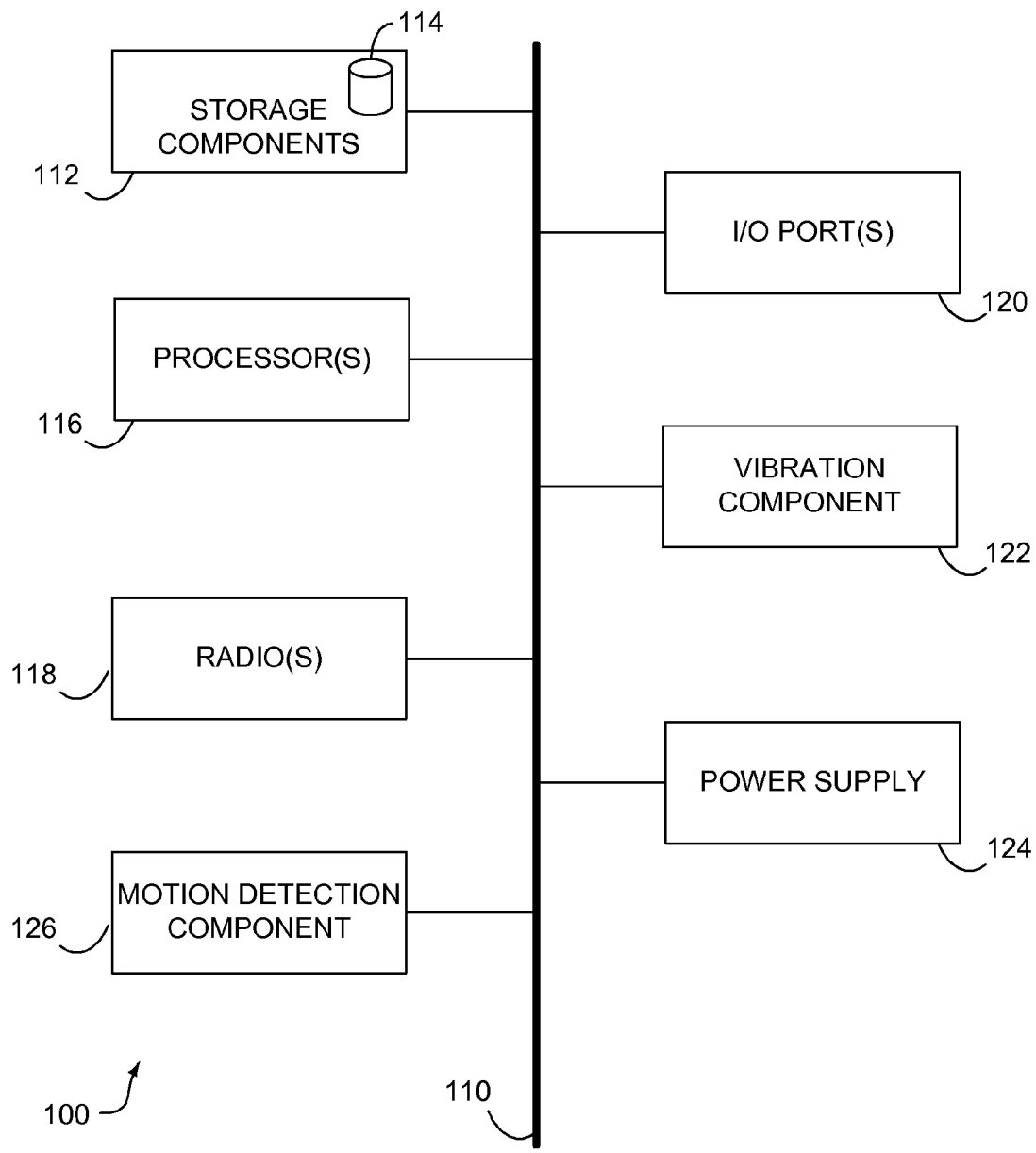
FIG. 1 is a block diagram of an exemplary mobile communications device that is suitable for operation, in accordance with an embodiment of the present invention.

The subject matter of the present invention is described with specificity herein to meet statutory requirements. Although the terms "step" and/or "block" may be used herein to connote different components of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3G | Third Generation |
| 4G | Fourth Generation |
| 802.11X | Specification for Wireless LAN Technology |
| CD-ROM | Compact Disk Read Only Memory |
| CDMA | Code Division Multiple Access |
| DVD | Digital Versatile Discs |
| FAX | Facsimile |
| GPRS | General Packet Radio Service |
| GPS | Global Positioning System |
| GSM | Global System for Mobile |
| LAN | Local Area Network |
| MMS | Multimedia Messaging |
| PDA | Personal Digital Assistant |
| RAM | Random Access Memory |
| ROM | Read Only Memory |
| TDMA | Time Division Multiple Access |
| TV | Television |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things, a method, system, or computer-program product. Accordingly, the embodiments may take the form of a hardware embodiment, or an embodiment combining software and hardware. In some embodiments, the present invention takes the form of a computer-program product that includes computer-useable instructions embodied on one or more computer-readable media.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

FIG. 1 depicts an illustrative block diagram of a mobile communications device that is suitable for operation of an embodiment of the present invention. FIG. 1 depicts a selection of components that will generally be included in the mobile communications device to help facilitate various functional aspects of embodiments of the invention. As shown, a bus 110 couples, directly or indirectly, to the following illustrative components: a storage component 112, a processor 116, a radio 118, input/output ports 120, a vibration component 122, a power supply 124, and a motion detection component 126.

Storage components 112 may take the form of the aforementioned computer-readable media. As with all of the illustrative components of FIG. 1, although we refer to them sometimes in the singular, that should not be read so as to imply that we mean only a single of each of the components is contemplated within the scope of our invention. To the contrary, by way of example, storage component or components 112 may actually be composed of constituent storage components located within mobile device 100. A portion or separate storage component includes database 114. In one embodiment, as will be described in more detail below, database 114 can be used to store past events, such as, but not limited to, text messages, e-mails, telephone call histories (e.g., missed calls, incoming calls, outgoing calls), voice-mails, calendar events, and the like.

Processors 116 facilitate a flow of information among all or a portion of the components shown in FIG. 1 as well as computer-usable instructions that help facilitate various aspects of the present invention. For example, in one embodiment, an operating system of mobile device 100 also helps coordinate various functional aspects of the present invention. Processors 116 operate in connection with running such an operating system.

Radios 118 facilitate the communication of wireless communication signals to and from mobile device 100. Illustrative protocols that can be utilized in connection with an embodiment of the present invention include CDMA, TDMA, GSM, GPRS, 3G, 4G, 802.11x, etc. The radios facilitate wireless communications between the device and a national or even global telecommunications network.

Input/output ports 120 provide a way for mobile device 100 to interact with other peripheral components. Illustrative input/output ports include an ear-piece or headphone jack, a USB port, an infrared port, and the like. Different input/output ports could be provided as is needed to facilitate communication of other peripheral components.

Vibrating component 122 enables mobile device 100 to experience a vibrating action incident to an occurrence of different events. Vibrating component 122 may take on a variety of forms, such as a motor that operates with an offset mass. In one embodiment, vibrating component 122 takes the form of a haptics motor. Vibrating component 122 includes the ability to operate at various frequencies, which can be controlled by way of different software or hardware mechanisms of mobile device 100.

Power supply 124 may also take on a variety of forms ranging from a battery to a charging mechanism to other forms of power sources that serve to provide power to mobile device 100.

Motion detection component 126 enables mobile device 100 to detect the device's own movement in order to provide motion-based event notifications. The level or threshold of detected motion may be varied depending on the use. For example, a threshold may be set that does not detect a phone's vibration, a slight movement that may be caused by an accidental movement of the mobile device, or the like. As such, the threshold of the motion detection component 126 may detect movement that is intentional. Further, even though significant motion may be detected by the motion detection component 126, two or more instances of motion within a predetermined amount of time (e.g., 5 seconds) may be required before the mobile device 100 transitions from a motionless state to a moved state. Motion may be detected by a variety of motion technologies, including, but not limited to, an accelerometer, a camera, GPS technology, gyroscopic detection, etc. Other forms of technology used to detect motion, in addition to those listed above, are considered to be within the scope of the present invention.

The selected components of mobile device 100 are meant to be illustrative in nature, and the various lower-level details of the components are not elaborated on so as to not obscure the present invention. Clearly, some of the components may be absent in some embodiments of the present invention, and additional components not shown may also be part of mobile device 100. Attempting to show all of the various components of mobile device 100 would obscure certain novel aspects, and we will refrain from such elaboration at least for the sake of brevity.

Figure 2:
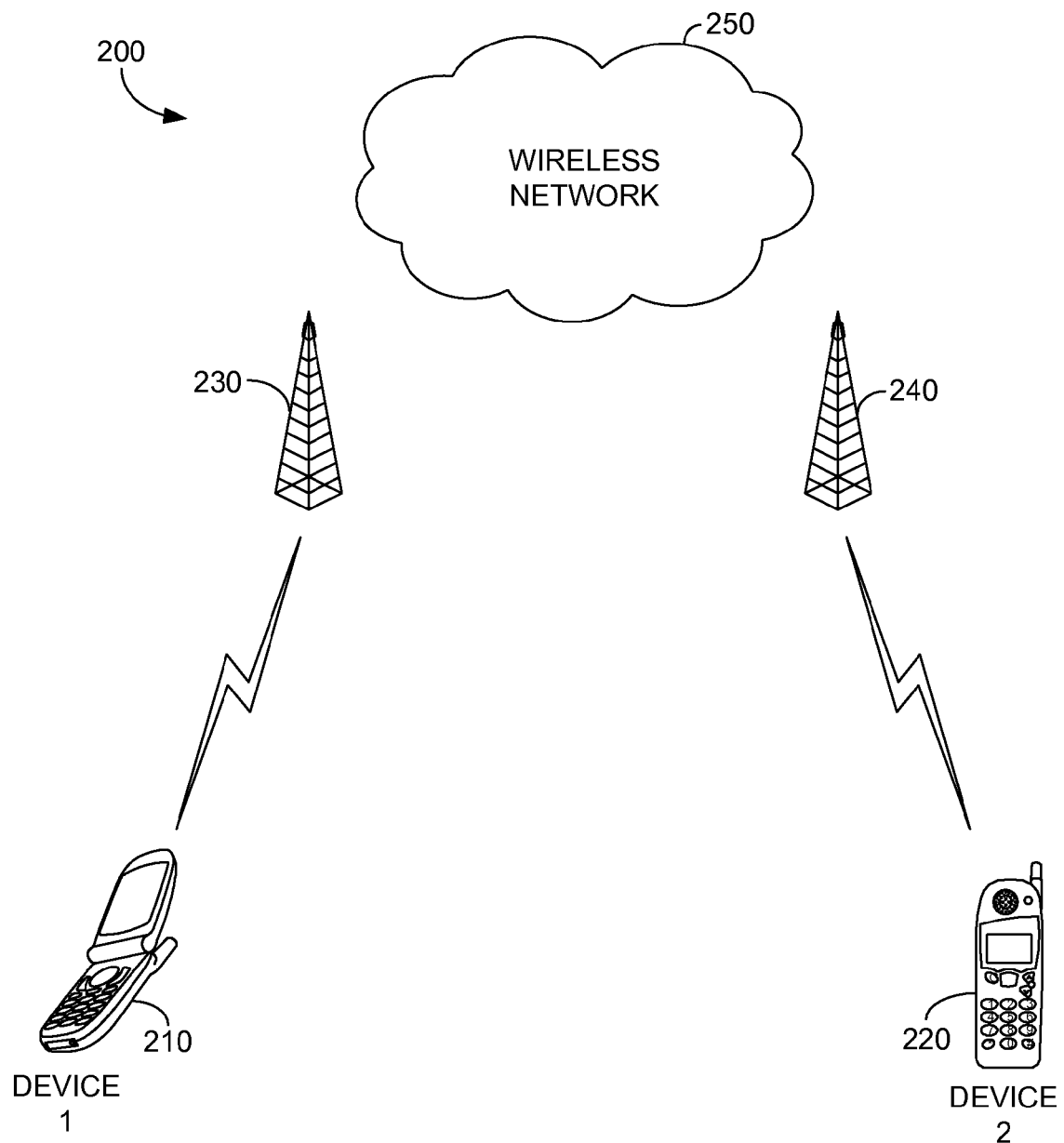
FIG. 2 is a schematic view of an exemplary communications environment suitable for use in implementing embodiments of the present invention.

Turning to FIG. 2, a schematic view of an exemplary communication environment 200 is illustrated and is suitable for use in implementing embodiments of the present invention. FIG. 2 comprises multiple devices, such as devices 210 and 220, which may be any type of mobile communications device, such as, but not limited to, a mobile phone, a personal digital assistant (PDA), or other handheld device that is capable of communicating with a communications network, such as wireless network 250. In some embodiments, network 250 includes an array of devices, which are not shown so as to not obstruct the more relevant aspects of the present invention. Network 250 will variously be referred to herein as a communications carrier (or just "carrier"). Components such as a base station or communications towers, such as towers 230 and 240, can provide wireless connectivity in some embodiments.

Figure 3:
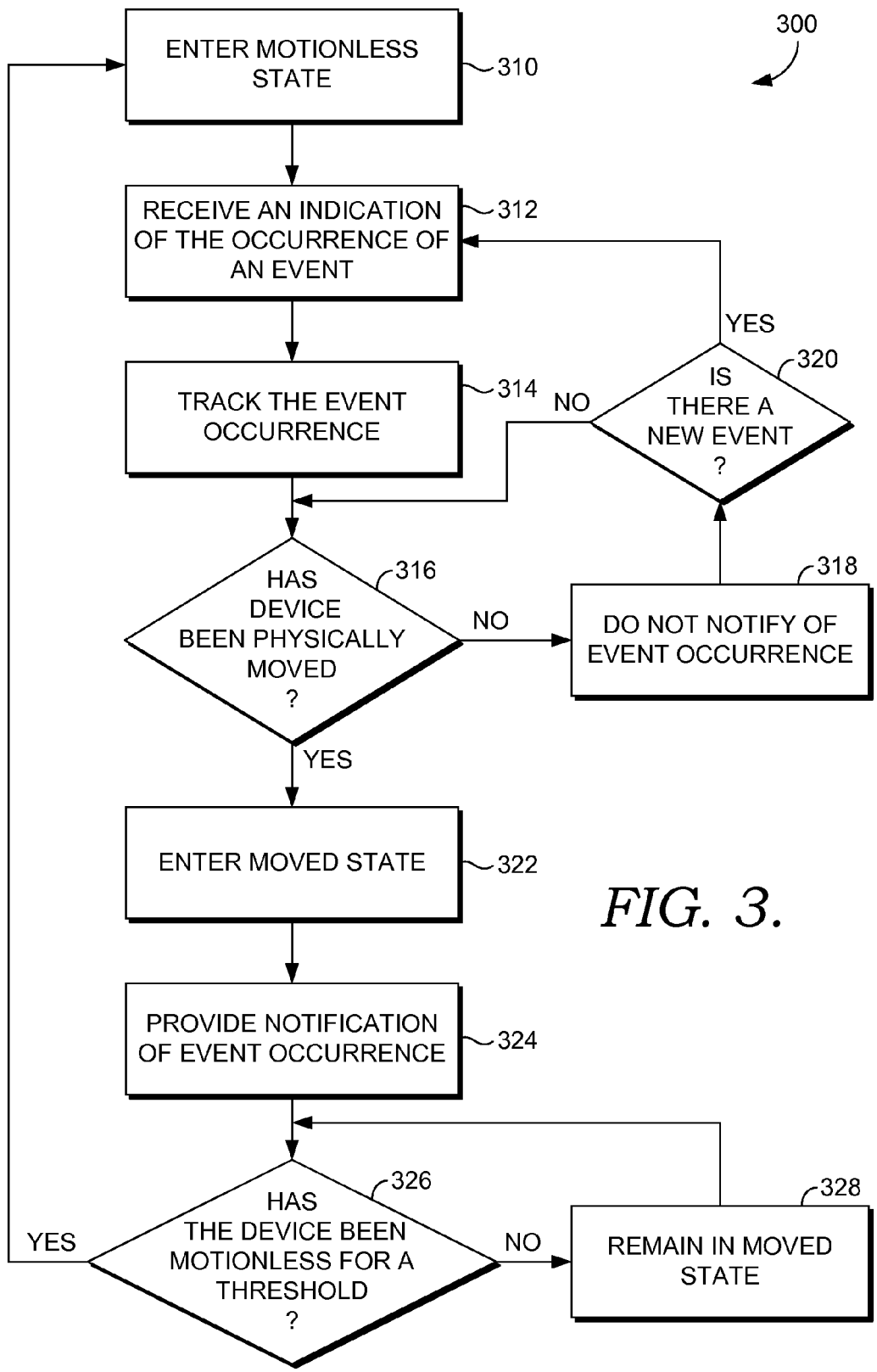
FIG. 3 depicts an illustrative flowchart for providing a notification of an event occurrence when a device has entered a moved state, in accordance with an embodiment of the present invention.

FIG. 3 depicts an illustrative flowchart 300 for providing a notification of an event occurrence when a device has entered a moved state, in accordance with an embodiment of the present invention. Initially, at step 310, the mobile communications device is in a motionless state. In one embodiment, a motionless state may be entered into after the mobile device has been motionless for a threshold of time, such as 1 minute, 5 minutes, 10 minutes, 60 minutes, etc. In another embodiment, a user may be able to determine, and program the device accordingly, when the mobile device is to be in a motionless state, such as when the user goes to sleep, is in a meeting, or the like. This allows the user to force the mobile communications device to enter a motionless state without waiting for automatic detection of motion. Also, the user may be able to define a time frame when the mobile device is to enter a motionless state, such as between the hours when the user is typically asleep, or when the user is typically in a meeting. When not in a motionless state, the mobile device may be in a moved state, which may be entered into as a result of detected movement of the mobile device, for example.

It should be noted that there may be a threshold level of motion that the device detects in order for the device to transition from a motionless state to a moved state. In one embodiment, the level or threshold of detected motion may be varied depending on the purpose of use. For example, a motion threshold may be set that does not detect a device's own vibration, a slight movement that may be caused by an accidental movement of the mobile device, or the like. As such, the threshold of the motion detection component 126 illustrated in FIG. 1 may have an increased success at detecting intentional movement, in comparison to a motion detector that detects and alerts when any movement, even the slightest movement of the device, is detected. Further, even though intentional motion may be detected by the motion detection component 126, two or more instances of motion within a predetermined amount of time (e.g., 5 seconds) may be required before the mobile device 100 transitions from a motionless state to a moved state. This allows for an assurance that the device was intentionally moved, rather than unintentionally moved. For instance, if a user is in a meeting and her device is placed on a table that is unintentionally bumped by a passerby, the device may not enter a moved state at that time unless motion is once again detected above the predetermined threshold.

An indication may be received at step 312 of an occurrence of an event. An event may include, but is not limited to, a telephone call, a text message, an e-mail, a voicemail, a calendar event, or any other form of communication that may be received or sent by a mobile communications device. Once received, the event occurrence may be tracked at step 314, and may be saved to the device's storage component, such as database 114. The event may be tracked along with its communication type (e.g., e-mail, text, voicemail, incoming call, calendar event), time, and date that the event was received by the device, and any other information that may be relevant to the user.

It may then be determined whether the device has been physically moved at step 316, so as to transition the phone to a moved state, instead of the previous motionless state. If the device has not been physically moved, or if the device has not detected that it has been moved, a notification may not be provided at that time of the event occurrence, which is shown at step 318. In the embodiment of FIG. 3, a notification may not be provided, but in other embodiments, it is contemplated to be within the scope of the present invention that a notification may be provided to the user of the event occurrence, even when the device is in a motionless state. It may then be determined at step 320 whether there is a new indication of an event received by the device. If so, the device receives that indication of the occurrence of the new event, as discussed at step 312. This new event may also be tracked by the device, as described above. If there is not a new indication, the flowchart illustrates that it is once again determined whether the device has been physically moved at step 316, as previously discussed.

Once it has been determined that the device has been physically moved at step 316, the device enters into a moved state at step 322. There are different ways that a device may enter a moved state. In one embodiment, the device is simply moved so that the movement can be detected by the device, and the device has entered into a moved state. In another embodiment, there may be a threshold of time between movement of the device and the device entering into a moved state. At step 324, because the device has entered into a moved state, a notification may be provided of the event occurrence. A notification may take one of many forms, including an audible notification (e.g., a ring, song, or other noise), a visible notification (e.g., flashing light, lit device display) or a vibrational notification.

With continued reference to FIG. 3, it may then be determined at step 326 whether the device is still in a moved state, or whether it has entered a motionless state. At step 326, it is determined whether the device has been motionless for a threshold of time. In the embodiment of FIG. 3, a predetermined threshold of time of the device being motionless is required for the device to leave a moved state and enter a motionless state. In another embodiment, however, there may be other requirements needed for the device to enter a motionless state. If the device has not been motionless for a predetermined threshold of time, the device remains in a moved state, as illustrated at step 328. If it has, the device enters a motionless state, as previously described at step 310.

Figure 4:
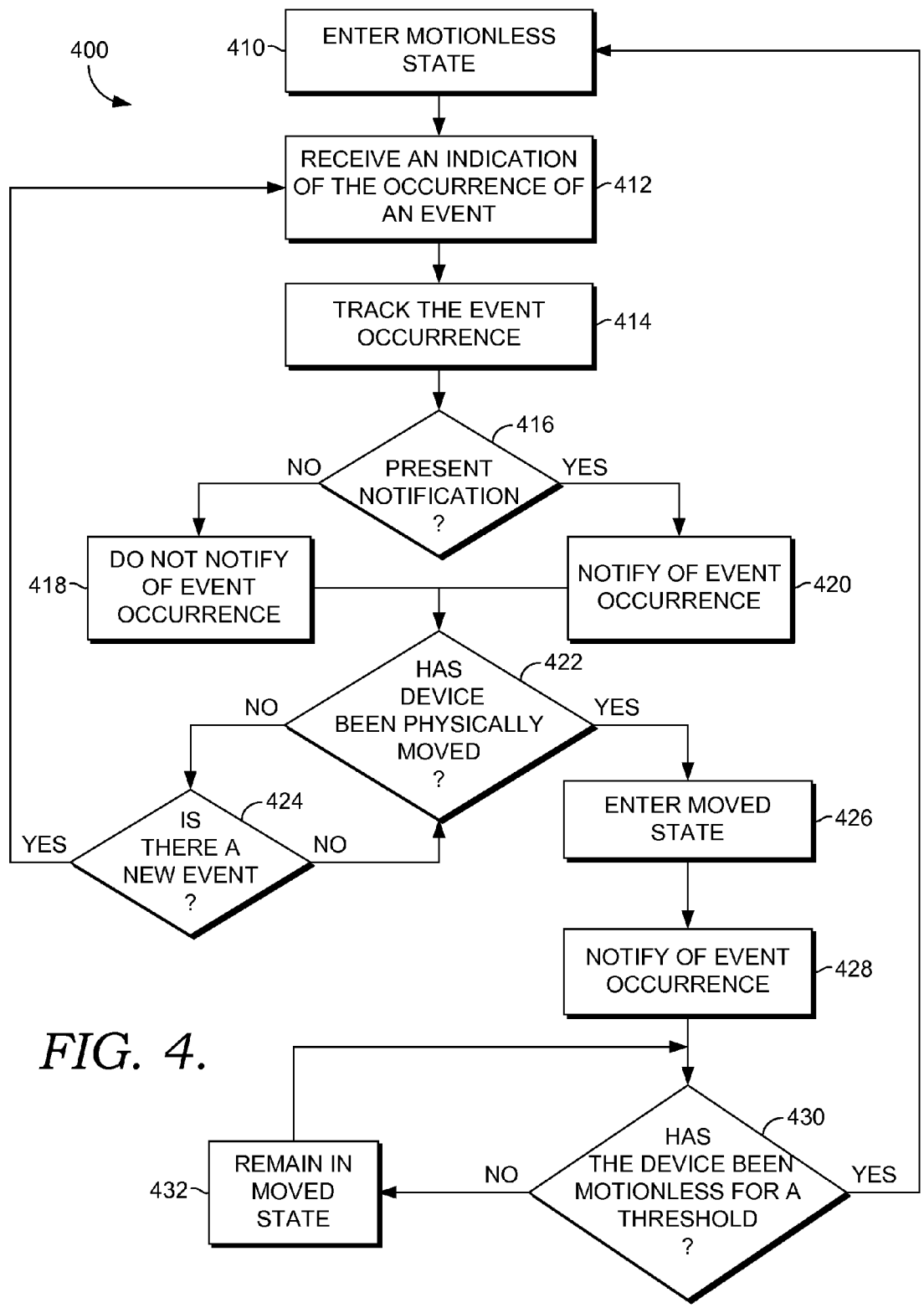
FIG. 4 depicts an illustrative flowchart for providing a notification of an event occurrence, in accordance with an embodiment of the present invention.

Referring now to FIG. 4, an illustrative flowchart 400 is shown for providing a notification of an event occurrence, in accordance with an embodiment of the present invention. A device enters a motionless state at step 410, which, as previously mentioned, may be entered into once the device has been motionless for a predetermined amount of time, such as a threshold of time. In one embodiment, the device is equipped such that it may determine when it has been moved. A motionless state may occur during times such as when a user is asleep, when a user is in a meeting for a prolonged period of time, or when the user is away from his or her device for any other reason. Of course, anytime that a device is motionless for a threshold of time may result in the device entering into a motionless state.

At step 412, an indication is received of an occurrence of an event. When an indication of an event (e.g., e-mail, text, voicemail, incoming call, calendar event) is received, that event may be tracked by the device, which is shown at step 414. More than one event may be received while the device is in a motionless state, and the device may track each event, so that a notification can be provided at a later time. The device may not only track the received event occurrences, but it may keep track of the order of the events based on a time that the events were received, the priority of the events, etc. Information related to the event may be saved to the device's storage component, such as database 114. The event may be tracked along with its communication type (e.g., e-mail, text, voicemail, incoming call), time, and date that the event was received by the device, and other information that may be relevant to the user, such as priority, information relating to an attribute, or the like.

It may be determined at step 416 whether a notification is to be presented on the device. In one embodiment, such as the embodiment of FIG. 3 described above, a notification may not provided until the device has entered a moved state. In other embodiments, to the contrary, such as the embodiment of FIG. 4, a notification may be provided even though the device is in a motionless state. In fact, more than one notification may be provided for the same event occurrence, as will be described below. A notification may take one of many forms, including an audible notification (e.g., a ring, song, or other noise), a visible notification (e.g., flashing light, lit device display), or a vibrational notification.

The determination as to whether a notification is to be presented or provided at this point, while the device is in a motionless state, may be determined by the user, who may modify this setting based on the user's circumstances, such as whether the user wishes to be interrupted by a notification at a given time. If it is determined that a notification is to be provided at step 416, a notification of the event occurrence is given at step 420. If it is determined that a notification is not to be provided at step 416, a notification of an event occurrence is not given at step 418.

Whether a notification of an event occurrence is provided or not at steps 418 and 420, it may then be determined whether the device has been physically moved, which is shown at step 422. If the device has not been physically moved, it may be determined whether there is a new event to track at step 424. If there is a new event, an indication of the occurrence of that event is received at 412, as previously discussed. If there is not a new event to track, it is once again determined whether the device has been physically moved, as previously discussed at step 422. If the device has been physically moved, as determined at step 422, the device may enter into a moved state at step 426, and thus a notification may be provided of the event occurrence at step 428.

It should be noted that even though a notification may, in one embodiment, have been provided earlier while the device was still in a motionless state, another notification may be provided at step 428 when the device has transitioned into a moved state. If there is more than one notification, the notifications may be the same (e.g., same ring, same song, same vibration), but in another embodiment, the notifications may be different. In one instance, the first notification may be audible and the second may be vibrational, but in another instance, the first notification may be vibrational and the second may be audible. It will be appreciated by one of ordinary skill in the art that there are a variety of methods of alerting or notifying a user that an event has occurred, and each of these methods is contemplated to be within the scope of the present invention.

In one embodiment, a second notification may only be provided if the first notification or alert has been left unhandled. A notification may be left unhandled if a user did not press an "ignore" or "dismiss" button, for example, at the time of the notification. In the event that a user does press an "ignore," "dismiss," or a similar button, the device may assume that the user has been made aware of the notification representing the received event, and may determine that the user does not need a second notification of the same event.

At step 430, it may be determined whether the device has been motionless for a threshold of time. In one embodiment, a predetermined threshold of time of the device being motionless is required for the device to leave a moved state and enter a motionless state. In another embodiment, however, there may be other requirements needed for the device to enter a motionless state. If the device has not been motionless for a predetermined threshold of time, the device remains in a moved state, as illustrated at step 432. If it has, the device enters a motionless state, as previously described at step 410.

For exemplary purposes only, a device may be motionless for eight hours while the user of the device is sleeping. In the morning, the user may pick up the device and put it in the user's pocket. Once the device has been picked up, it may detect that it has been moved, and may then transition into a moved state, rather than the previous motionless state. The user may attend a meeting at work and leave the phone on the user's desk. The phone may remain motionless for a period of time, such a 5 minutes, 20 minutes, 60 minutes, or even longer. This amount of time may be predetermined by the user in one instance, or by the device manufacturer or programmer in another instance. Once this threshold of time has been met, the phone may enter a motionless state.

Once again referring to FIG. 4, if the device has not been motionless for a threshold of time, the device will remain in the moved state as shown at step 432, and it may continually be determined whether the device has been motionless for a threshold of time. If the device has been motionless for the predetermined amount of time, it reenters a motionless state, such as that shown at step 410, and as previously described.

Figure 5:
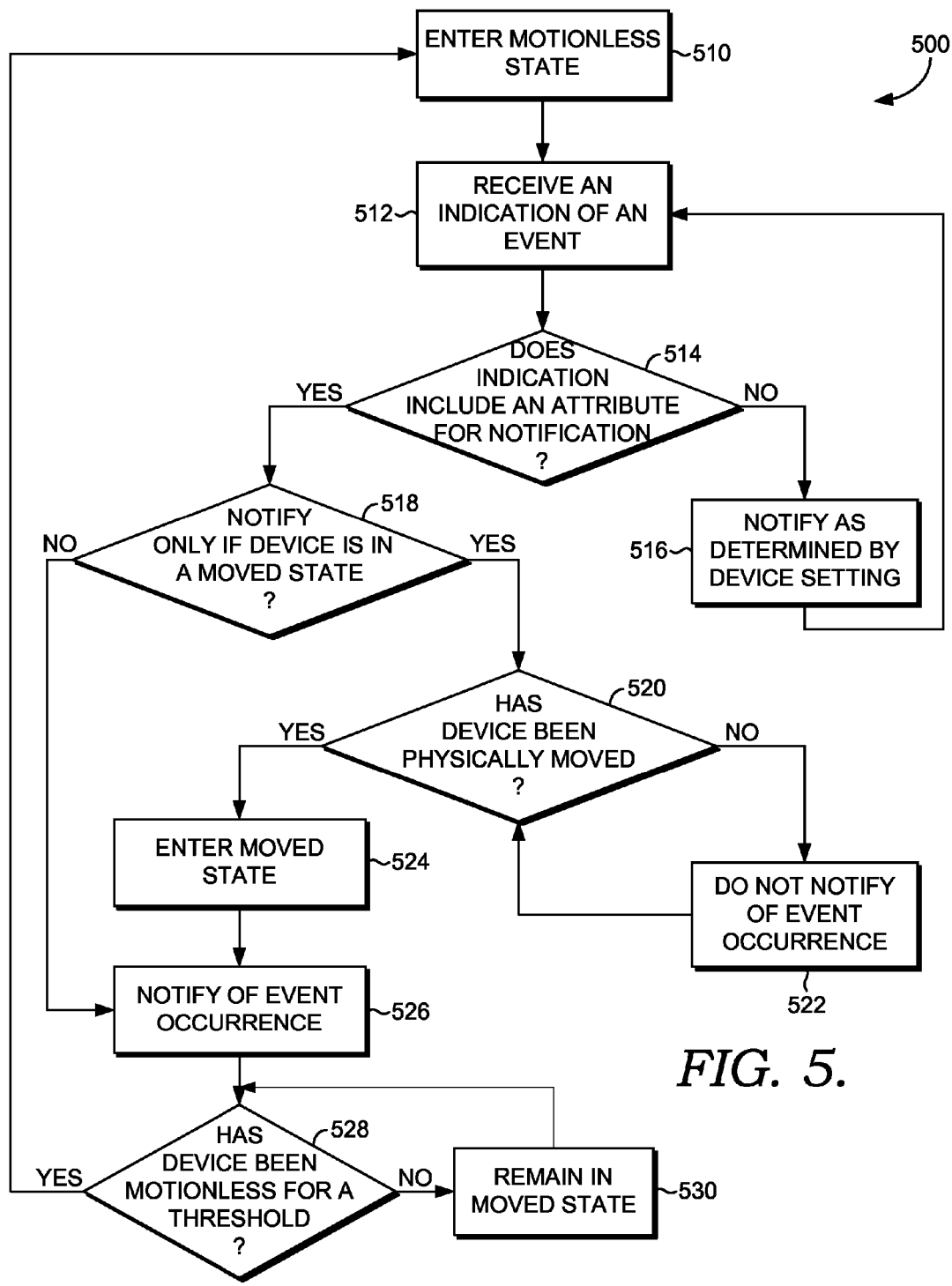
FIG. 5 depicts an illustrative flowchart for providing a notification of an event occurrence based on an attribute for notification of the event occurrence, in accordance with an embodiment of the present invention.

FIG. 5 depicts an illustrative flowchart 500 for providing a notification of an event occurrence based on an attribute for notification of the event occurrence, in accordance with an embodiment of the present invention. Initially, at step 510, the device is in a motionless state. An indication of an event may be received at step 512, wherein the event may be one or more of an e-mail, text, voicemail, incoming call, calendar event, etc. Once received, it may be determined at step 514 whether the indication includes an attribute defining the circumstances for providing a notification for the event occurrence.

In one embodiment, an attribute may be defined by the sender of the event (e.g., person calling the user of the device, person sending the e-mail or text message), wherein the sender may decide when the user is to be provided with a notification of the event occurrence. For example, a sender of a text message may send the message when the sender is aware that the user, or recipient of the message, is asleep. The sender may decide that the recipient is not to be notified of the event occurrence (e.g., text message) until the device has entered a moved state.

Another example may be that the sender of the text message or other form of communication may determine that the message is not very important and does not need to be conveyed to the recipient at that time. The sender may send, along with the message, an attribute that may flag the recipient's device not to notify the recipient until a certain time, such as when the device has entered a moved state. Alternatively, another option may be that the sender may choose to allow for a notification of the text message or other communication type, but may choose only a visual notification, suppressing any form of audio or vibrational notification. This may be useful when the sender is aware that the recipient is in a meeting, for example, and determines that only a visual indication would be appropriate at that time.

In an alternate embodiment, the user or recipient may be able to make the determination as to when notifications are provided, such as certain forms of communications or events from certain senders, such as family members. In this embodiment, when an event occurrence is received by the device, the device looks at its own settings, which may be user determined, and decides whether a notification is to be provided at that time. Based on the settings, the device behaves in the appropriate manner (e.g., provides notification if device is in a motionless state, provides notification if device is in a moved state, or provides notification regardless of state). If the device determines that a notification is not to be provided at the current time (e.g., if the user does not want notifications of event occurrences while the device is in a motionless state), a notification may be provided when the device enters a moved state.

With continued reference to FIG. 5, if the indication of the event occurrence does not include an attribute defining whether and/or when a notification is to be provided, the device may provide a notification as determined by settings on the device, as shown at step 516, which may be defined by the user of the device. If the indication does include an attribute defining whether and/or when a notification is to be provided at step 514, it may then be determined whether a notification is only to be provided if the device is in a moved state, as shown at step 518. If not, a notification may be provided at that time of the event occurrence, regardless of the state of the device. Even if the device is in a motionless state, a notification may still be provided. This may occur if there is an important call, calendar event, text message, voicemail, etc., as determined by the sender of the communication.

Alternatively, if it is determined at step 518 that a notification is only to be provided if the device is in a moved state, it may be determined at step 520 whether the device has been physically moved. If the device has not been physically moved, the notification of the event occurrence is not provided at that time, as shown at step 522, and it is continually determined whether the device has been physically moved until the answer is affirmative. Once it has been determined that the device has been physically moved at step 520, the device enters a moved state at step 524, and a notification may then be provided of the event occurrence, shown at step 526.

At step 528, it is determined whether the device has been motionless for a threshold of time. In the embodiment of FIG. 5, a predetermined threshold of time of the device being motionless is required for the device to leave a moved state and enter a motionless state. In another embodiment, however, there may be other requirements needed for the device to enter a motionless state. If the device has not been motionless for a predetermined threshold of time, the device remains in a moved state, as illustrated at step 530. If it has, the device enters a motionless state, as previously described at step 510.

Figure 6:
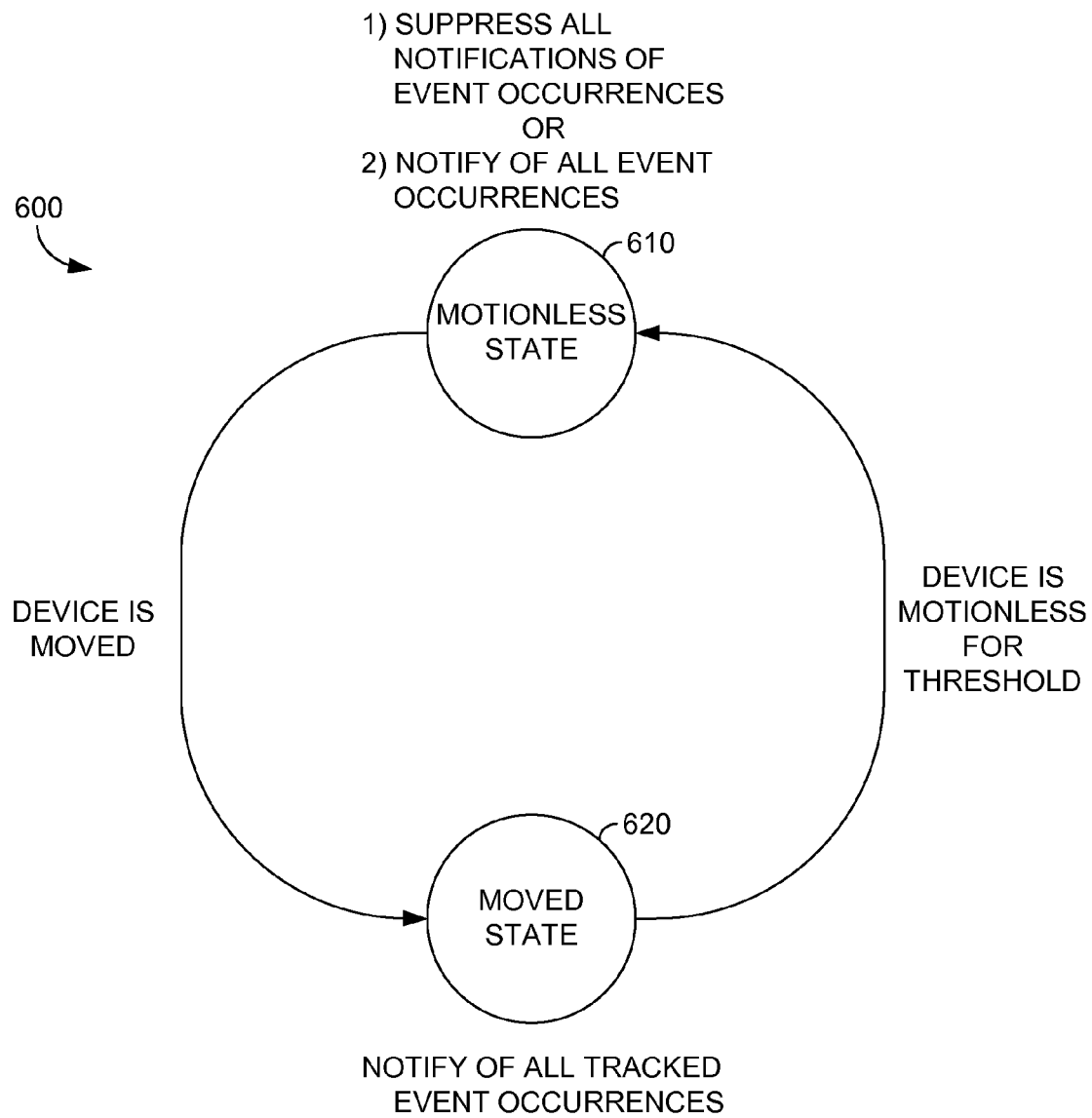
FIG. 6 depicts a state diagram illustrating various embodiments of the present invention.

Turning now to FIG. 6, a state diagram 600 is shown illustrating various embodiments of the present invention. Item 610 represents a motionless state, and item 620 represents a moved state. As previously discussed, a motionless state, in one embodiment, is entered into by a mobile communications device when the device has been motionless for a predetermined amount of time, which may vary from a short amount of time to a longer period of time (e.g., 5 minutes, 30 minutes, 60 minutes). To enter a moved state 620, the device, in one instance, is moved, and that movement of the device may be detected by the device. Once the device detects that it has been moved, the device may enter a moved state 620. In a motionless state, such as at 610, if an indication of an event is received, a notification may or may not be provided at that time.

In one embodiment, all notifications of event occurrences are suppressed while the device is in a motionless state 610. But, in another embodiment, notifications of event occurrences are provided even when the device is in a motionless state 610. As previously mentioned, in one instance, the device enters a moved state 620 when the device detects that it has been moved. Once in a moved state 620, in one embodiment, a notification of all tracked event occurrences is provided by way of the device. The device may remain in a moved state 620 until it has been motionless for a threshold of time, which may be predetermined or set by the user.

Figure 7:
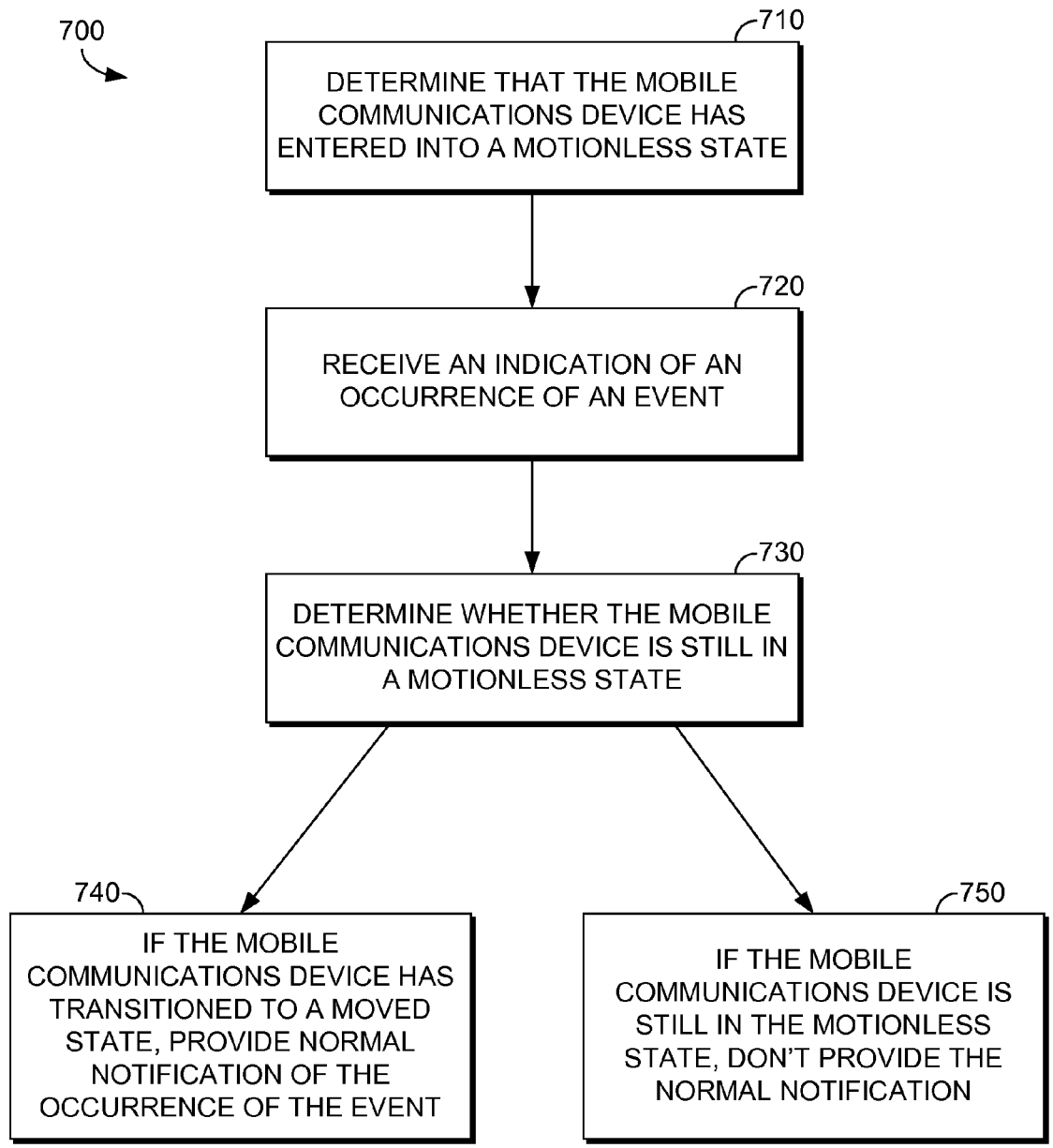
FIG. 7 illustrates a method for presenting by way of a mobile communications device a notification of an occurrence of an event, in accordance with an embodiment of the present invention.

FIG. 7 illustrates a method 700 for presenting by way of a mobile communications device a notification of an occurrence of an event, in accordance with an embodiment of the present invention. Initially at step 710, it may be determined that a mobile communications device has entered into a motionless state. A motionless state may be entered into in a variety of ways. Once such way is for the device to be motionless (e.g., not having been physically moved) for a period of time, which may be a predetermined period, or a threshold of time. This may occur, for example, if the device is sitting on a desk or a nightstand while its user is in a meeting or is sleeping. The threshold of time may be user-defined, or may be predetermined by an entity, such as the telecommunications provider. Once the device detects that it has been moved, it may transition from a motionless state to a moved state. A motionless state may be characterized by a set of attributes, which, in one embodiment, may be observable. Attributes may be, for example, a blinking light on the device, a non-blinking light on the device, a light on the device that is consistently lit, a nonvibrating state, or the like.

An indication of an occurrence of an event may be received at step 720. An event may include, for example, an incoming call, a missed call, a voicemail, a text message, an e-mail, or a calendar event. In one embodiment, more than one event may be received while the device is in a motionless state. These received indications of one or more events may be tracked within the device, such as in a queue, which may be saved to a database, such as database 114. The tracked events may be retrieved at a later time when a notification of these events is to be provided, such as when the device has entered a moved state or when the device is otherwise directed to provide a notification. If an indication of a second occurrence of a second event is received, similar steps may be taken to track and queue the event occurrence, in addition to steps discussed below.

Further, it may be determined whether the mobile communications device is still in a motionless state at step 730. If the device has transitioned to a moved state, by, for example, the device detecting movement, a normal notification of the occurrence of the event may be provided at step 740. In one embodiment, a normal notification is a notification that would have been provided if the device were not in a motionless state. In another embodiment, a normal notification is one that is provided regardless of the state of the device (e.g., motionless state, moved state). The normal notification may be any type of notification, such as, but not limited to, an audible, visible, or vibrational notification, and may include varying one or more of the attributes described above associated with the motionless state.

An audible notification may include a ring, a song, or any other type of audio that indicates that an event has been received by the device. A visible notification may be some form of a light, such as a flashing light or a lit device display. A vibrational notification may take the form of a simple and continuous vibration, or some vibrational pattern that is sufficient to indicate to a user that an indication of an event has been received. If it is determined that the device is still in a motionless state, a normal notification may not be provided at that time, shown at step 750, and may be provided, for instance, when the device has entered a moved state, as previously described.

If it is the case that more than one indication of event occurrences are received by the device, such as a second occurrence of a second event, while the device is in a motionless state, it may be determined whether the device is still in a motionless state before a notification is provided for those event occurrences. In one embodiment, a notification will be provided once the device has transitioned to a moved state, such as when the device has detected that it has been moved. Also, a notification may not be provided if it is determined that the device is still in a motionless state.

Figure 8:
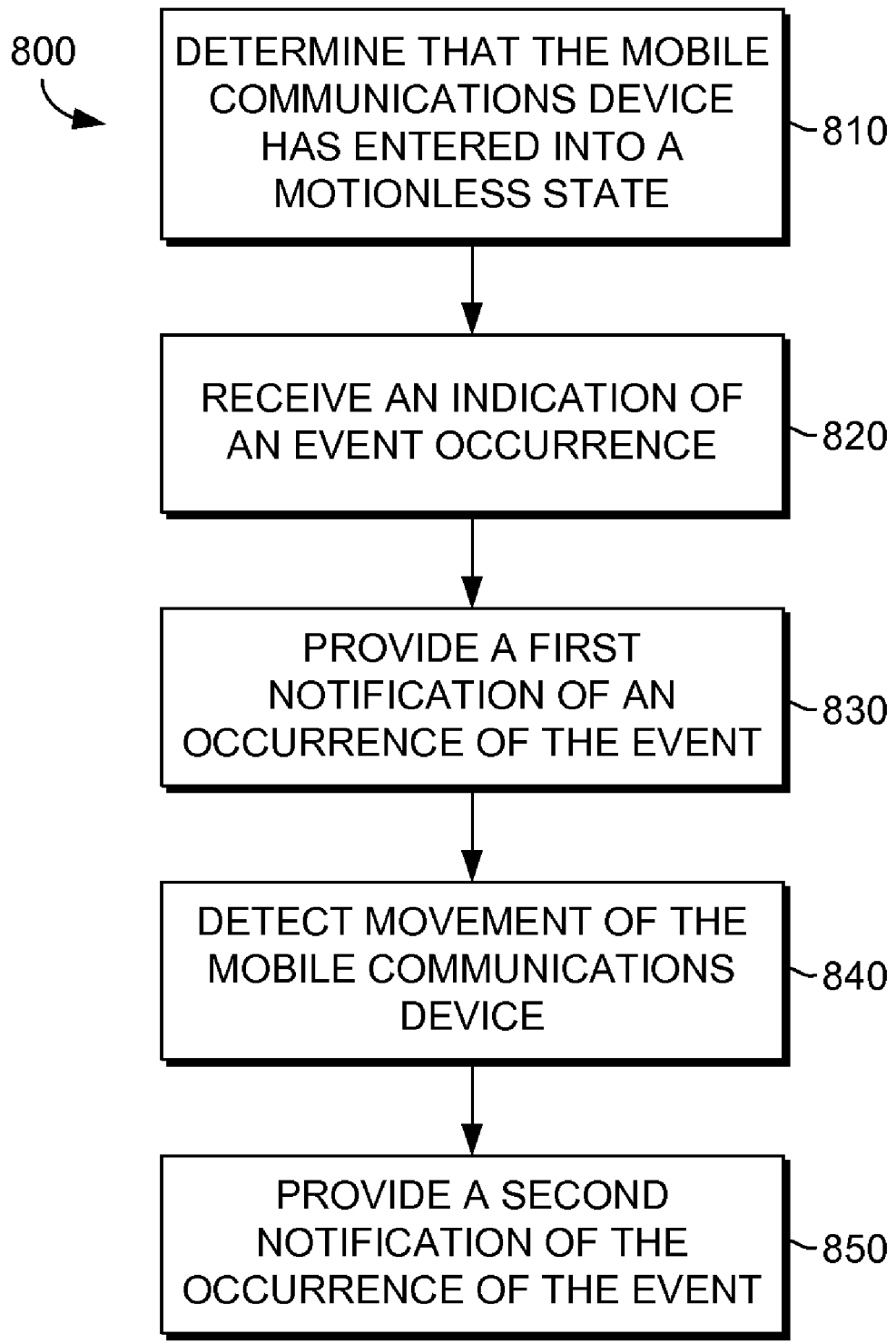
FIG. 8 illustrates a method for presenting more than one notification by way of a mobile communications device of an occurrence of an event, in accordance with an embodiment of the present invention.

Referring to FIG. 8, a method 800 is illustrated for presenting more than one notification by way of a mobile communications device of an occurrence of an event, in accordance with an embodiment of the present invention. It may be determined that the mobile communications device has entered into a motionless state at step 810. An indication of an occurrence of an event may be received at step 820. An event, as previously mentioned, may be one or more of a telephone call (e.g., incoming call, missed call), a voicemail, a text message, an e-mail, a calendar event, etc. Any type of communication that may be received or sent by a device may be considered to be an event.

At step 830, a first notification of the occurrence of the event may be provided, even though the device is in a motionless state. To differentiate the embodiment of FIG. 8 from that of FIG. 7, here, a notification is provided when the device is in a motionless state, and further, may be provided irrespective of the device's state. In FIG. 7, a notification was not provided when it was determined that the device was in a motionless state.

At step 840, movement of the device may be detected (e.g., by the device), and as such, the device may no longer be in a motionless state. The device, as a result of the movement, may have entered or transitioned into a moved state. Now, a second notification of the event occurrence may be provided at step 850, although a notification has already been provided in regard to the same event occurrence. For exemplary purposes only, a device may be in a motionless state, but the device may be within range of the user so that the user can see or hear notifications from the device. But, in the case that the user is not within range of the device to see or hear these notifications, the embodiment of FIG. 8 provides for a second notification when the device enters a moved state, which allows for a greater chance that the event occurrence(s) is brought to the user's attention.

In one embodiment, the first notification and the second notification are different (e.g., different sounds, different rings). The two notifications may even be different types of notifications. The first notification may be an audible notification, and the second may be a vibrational notification. Any combination of the notification types described above are contemplated to be within the scope of the present invention. If more than one event occurrences or indications are received while a device is in a motionless state and the device is not to provide a notification until the device has entered a moved state, one notification may be provided for the multiple event occurrences once the device has transitioned to a moved state.

Figure 9:
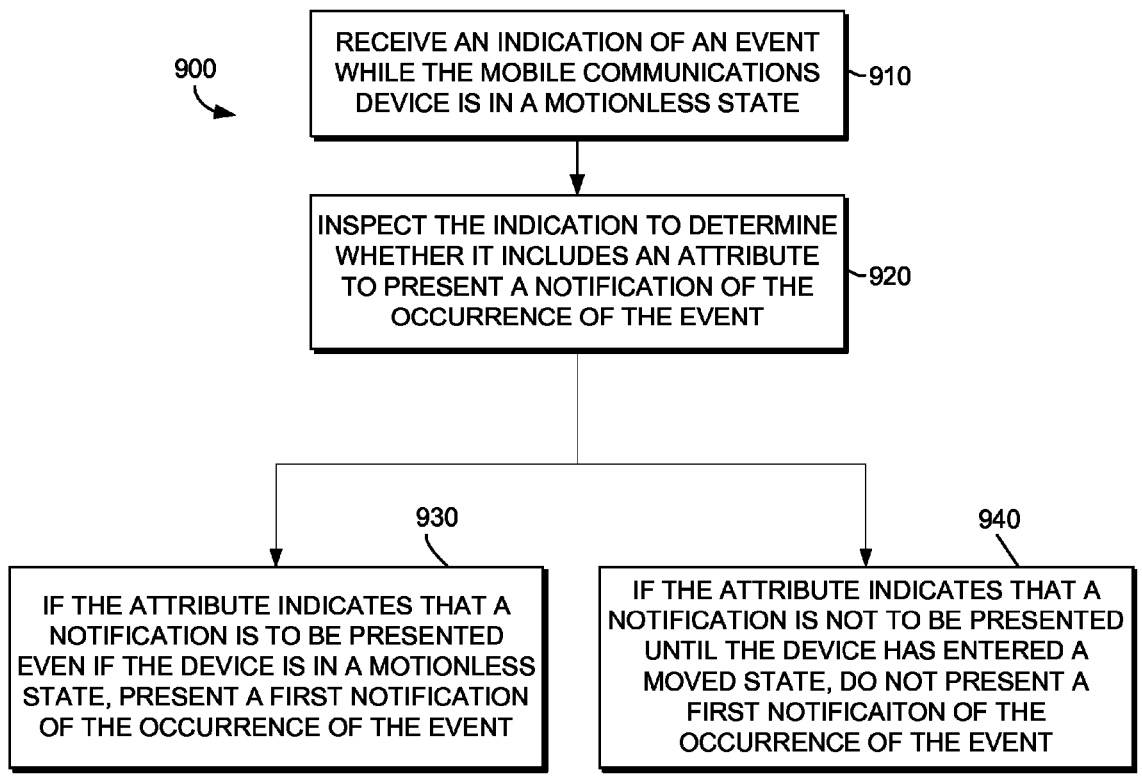
FIG. 9 illustrates a method for providing by way of a mobile communications device a notification of an occurrence of an event based on an attribute associated with the event, in accordance with an embodiment of the present invention.

Now turning to FIG. 9, a method 900 is shown for providing by way of a mobile communications device a notification of an occurrence of an event based on an attribute associated with the event, in accordance with an embodiment of the present invention. Initially, an indication of an event may be received while the device is determined to be in a motionless state, such as when the device has not been moved (e.g., device has not detected its movement) for a threshold of time. This is shown at step 910. A motionless state may be characterized by notifications of event occurrences normally being suppressed, or not normally being provided during that state.

At step 920, the indication of the event occurrence is inspected to determine whether it includes an attribute related to the notification of the event occurrence. An attribute may indicate that the device is to present a notification of the event occurrence even if the device is in a motionless state, for example, and may be defined by any party involved in sending or receiving the event.

In one embodiment, the attribute is defined by the sender. Here, the sender may determine that the event is not of particular importance and decides that the recipient should not be notified until the device is in a moved state, indicating that the recipient may not be in an important meeting, sleeping, etc., and may be available to receive a notification of the event occurrence without being disrupted. An alert mechanism on the device that is responsible for determining when to provide a notification may perform the inspection of the indication and behave (e.g., provide notification, do not provide notification) in an appropriate manner in accordance with the attribute, or flag associated with the event occurrence.

In an alternative embodiment, the attribute is defined by the recipient, or user of the device. The sender may not define an attribute or may not have the capability of defining an attribute associated with an event, and so the user may be able to determine when the device provides a notification of a received event occurrence. There may be different instances within this alternate embodiment that define when a notification is provided. In one instance, a user may be able to define, within the device, which types of events or even which events based on the sender of the event trigger a notification, irrespective of the state of the device.

For example, the user may wish to always receive a notification of an event occurrence if it is sent by an immediate family member. The device's alert mechanism may look to the device's own settings to determine if the sender of the event has been determined by the user to be a priority sender, and therefore notifications for all events from that particular sender are to be provided, even if the device is in a motionless state at the time that the event indication is received. In another instance, the user may define via the device certain times of the day or certain days when notifications of event occurrences are not to be provided when the device is in a motionless state. When an event is received, the device's alert mechanism may look to the device's settings to determine if the time of receipt of the event indication corresponds to a time or day defined in the device's settings when notifications are not to be provided (e.g., if the device is in a motionless state).

If the attribute indicates that the device is to present the notification of the event occurrence even if the mobile communications device is in a motionless state, a first notification of the event occurrence may be provided, as illustrated at step 930. If, however, the attribute indicates that a notification is not to be presented until the device has entered a moved state (e.g., no notification if device is in a motionless state), then a first notification of the event occurrence is not presented, as shown at step 940. Once movement has been detected and the device has entered or transitioned into a moved state, a notification may be presented of the event occurrence. This notification may be provided even if a first notification has already been presented, which may be dependent upon the attribute associated with the event occurrence.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon, that when executed by a computing device, perform a method of providing by way of a mobile communications device a notification of an occurrence of an event, the method comprising:
   determining that the mobile communications device has entered into a motionless state, wherein the mobile communications device has not physically moved for a threshold of time;
   while in the motionless state, receiving a first indication of the occurrence of a first event;
   providing a visual only notification of the first event;
   determining that the mobile communications device has transitioned to a moved state;
   providing a normal notification of the occurrence of the first event,
   (1) wherein the moved state begins when the mobile communications device is physically moved after having entered the motionless state,
   (2) wherein the normal notification is provided when the mobile communications device is not in the motionless state; and
   (3) wherein providing the visual only notification and providing the normal notification are determined by a sender of the first event.

2. The computer-readable media of claim 1, wherein physical movement of the mobile communications device occurs when motion above a predetermined threshold is detected.

3. The computer-readable media of claim 1, wherein physical movement of the mobile communications device occurs when two or more instances of motion are detected within a predetermined amount of time.

4. The computer-readable media of claim 1, wherein the motionless state is characterized by a set of attributes.

5. The computer-readable media of claim 4, wherein the set of attributes includes one or more of a nonblinking light, a blinking light, a non vibrating state, or a silent state that suppresses all sounds emitted by the mobile communications device.

6. The computer-readable media of claim 5, wherein the normal notification includes varying one or more of the attributes.

7. The computer-readable media of claim 1, wherein the event is one or more of a telephone call, a voicemail, a text message, an e-mail, or a calendar event.

8. The computer-readable media of claim 1, further comprising tracking the occurrence of the event in a queue.

9. The computer-readable media of claim 1, wherein the threshold of time is defined by a user.

10. The computer-readable media of claim 1, wherein the first normal notification is not provided while the mobile communications device is in the motionless state.

11. One or more non-transitory computer-readable media having computer-useable instructions embodied thereon, that when executed by a computing device, perform a method of providing by way of a mobile communications device more than one notification of an occurrence of an event, the method comprising:
   determining that the mobile communications device has entered into a motionless state, the motionless state being characterized by the mobile communications device not having been moved for a predetermined amount of time;
   while in the motionless state, receiving an indication of the occurrence of the event;
   upon receiving the indication of the occurrence of the event, providing a first notification of the occurrence of the event;
   detecting intentional movement of the mobile communications device, thereby removing the mobile communications device from the motionless state; and
   upon detecting the movement, providing a second notification of the occurrence of the event, wherein providing the first notification and providing the second notification are determined by a sender of the event.

12. The computer-readable media of claim 11, wherein a vibration or a slight accidental movement of the mobile communications device does not remove it from the motionless state.

13. The computer-readable media of claim 11, wherein the first notification is different than the second notification.

14. The computer-readable media of claim 11, wherein the event is one or more of a telephone call, a voicemail, a text message, an e-mail, or a calendar event.

15. One or more non-transitory computer-readable media having computer-useable instructions embodied thereon, that when executed by a computing device, perform a method of providing a notification by way of a mobile communications device of an occurrence of an event, the method comprising:
   receiving an indication of an event while the mobile communications device is in a motionless state, which is characterized by suppressing a normal notification of an occurrence of an event; and
   inspecting the indication to determine whether the indication includes an attribute, as determined by a sender of the event, indicating that the mobile communications device is to present an initial notification of the occurrence of the event even when the mobile communications device is in the motionless state, so that, when the attribute indicates that the mobile communications device is to present the initial notification of the occurrence of the event even when the mobile communications device is in the motionless state, presenting the initial notification of the occurrence of the event, wherein the normal notification, different from the initial notification, of the occurrence of the event is presented when the initial notification is not acknowledged by a user of the mobile communications device, and when the attribute indicates that the mobile communications device is not to present the normal notification of the occurrence of the event until the mobile communications device has entered a moved state, not presenting the normal notification of the occurrence of the event.

16. The computer-readable media of claim 15, wherein a user of the mobile communications device determines when the mobile communications device is in the motionless state.

17. The computer-readable media of claim 15, wherein when the normal notification of the occurrence of the event has not been presented, further comprising:

detecting movement of the mobile communications device; and determining that the mobile communications device has entered a moved state.

18. The computer-readable media of claim 17, further comprising upon the mobile communications device having entered the moved state, presenting the normal notification of the occurrence of the event.

19. The computer-readable media of claim 15, wherein when the initial notification of the occurrence of the event is presented, further comprising:

determining that the mobile communications device has entered a moved state; and presenting the normal notification of the occurrence of the event.

\* \* \* \* \*